(12) United States Patent
Fan et al.

(10) Patent No.: US 10,801,132 B2
(45) Date of Patent: Oct. 13, 2020

(54) HIGH-UNIFORMITY COLOURED POLYESTER INDUSTRIAL YARN

(71) Applicant: JIANGSU HENGLI CHEMICAL FIBRE CO., LTD., Wujiang (CN)

(72) Inventors: Hongwei Fan, Wujiang (CN); Lili Wang, Wujiang (CN); Xiaobing Fan, Wujiang (CN); Damao Yang, Wujiang (CN); Guangkun Song, Wujiang (CN); Huirong Zhao, Wujiang (CN); Shanshui Wang, Wujiang (CN)

(73) Assignee: JIANGSU HENGLI CHEMICAL FIBRE CO., LTD., Wujiang (CN)

( * ) Notice: Subject to any disclaimer, the term of this patent is extended or adjusted under 35 U.S.C. 154(b) by 125 days.

(21) Appl. No.: 16/322,949

(22) PCT Filed: Jun. 26, 2017

(86) PCT No.: PCT/CN2017/089944
§ 371 (c)(1),
(2) Date: Feb. 3, 2019

(87) PCT Pub. No.: WO2018/040689
PCT Pub. Date: Mar. 8, 2018

(65) Prior Publication Data
US 2020/0199788 A1 Jun. 25, 2020

(30) Foreign Application Priority Data

Aug. 31, 2016 (CN) .......................... 2016 1 0784610

(51) Int. Cl.
| | | |
|---|---|---|
| *C08G 63/183* | (2006.01) | |
| *D01D 5/247* | (2006.01) | |
| *D01D 5/253* | (2006.01) | |
| *D01D 5/08* | (2006.01) | |
| *C08G 63/91* | (2006.01) | |
| *D01D 4/02* | (2006.01) | |
| *D01F 6/84* | (2006.01) | |
| *D01F 6/92* | (2006.01) | |
| *C08J 3/22* | (2006.01) | |
| *C08L 67/02* | (2006.01) | |
| *D01F 1/06* | (2006.01) | |
| *D01F 1/10* | (2006.01) | |

(52) U.S. Cl.
CPC .................. *D01F 6/92* (2013.01); *C08J 3/22* (2013.01); *C08L 67/02* (2013.01); *D01D 4/02* (2013.01); *D01D 5/08* (2013.01); *D01F 1/06* (2013.01); *D01F 1/10* (2013.01); *D01F 6/84* (2013.01); *C08L 2203/12* (2013.01); *C08L 2310/00* (2013.01)

(58) Field of Classification Search
None
See application file for complete search history.

(56) References Cited

U.S. PATENT DOCUMENTS

2012/0202964 A1* 8/2012 Li ........................ C08G 63/672
528/301

FOREIGN PATENT DOCUMENTS

| CN | 102030893 A | | 4/2011 | |
|---|---|---|---|---|
| CN | 102648231 A | * | 8/2012 | ............ C08G 3/672 |
| CN | 102648231 A | | 8/2012 | |
| CN | 102787383 A | | 11/2012 | |
| CN | 102851757 A | | 1/2013 | |
| CN | 106245150 A | | 12/2016 | |

\* cited by examiner

*Primary Examiner* — Christopher M Rodd
(74) *Attorney, Agent, or Firm* — Bayramoglu Law Offices LLC (57) ABSTRACT

A high uniformity coloured polyester industrial yarn and preparation method. The raw material of the high-uniformity coloured polyester industrial yard is the modified polyester composed of terephthalic acid segment, an ethylene glycol segment and a branched diol. The high-uniformity coloured polyester industrial yarn is prepared by esterification reaction of terephthalic acid with a branched diol using concentrated sulfuric acid as catalyst to obtain terephthalic acid glycol ester. Terephthalic acid and ethylene glycol are formulated to carry out esterification reaction to obtain ethylene terephthalate. Finally, stir and mix the two materials and carry out the polycondensation reaction in the low vacuum stage and the high vacuum stage under the action of the catalyst and the stabilizer to obtain modified polyester. Measure the modified polyester and add black masterbatch. After porous spinneret extrusion, cooling, oiling, drawing, heat setting and winding the modified polyester, high uniformity coloured polyester industry yarn is obtained.

12 Claims, 3 Drawing Sheets

HIGH-UNIFORMITY COLOURED POLYESTER INDUSTRIAL YARN

CROSS REFERENCE TO THE RELATED APPLICATIONS

This application is the national phase entry of International Application No. PCT/CN2017/089944, filed on Jun. 26, 2017, which claims priority from the Chinese patent application no. 201610784610.4 filed on Aug. 31, 2016, the entire contents of which are incorporated herein by reference.

TECHNICAL FIELD

The invention relates to the field of polyester fiber and relates to a high-uniformity coloured polyester industrial yarn and its preparation method.

BACKGROUND

Poly (ethylene terephthalate) (PET fiber or polyester fiber) fiber has high breaking strength and elastic modulus, moderate elasticity and excellent heat setting since it is invented. Heat resistance and light resistance, acid resistance, alkali resistance and corrosion resistance are a series of excellent properties, and the fabric has the advantages of crease resistance, ironing resistance, good fastness and so on. It is widely used in clothing, home textile and other fields.

However, because of the high crystallinity, dense structure and no functional groups on the molecular chain, the dye molecules are difficult to enter the fiber, and it is difficult to dye. Cannot meet people for bright and beautiful, unique style of fabric demand.

The reason for the difficulty of PET staining is that PET belongs to symmetrical straight chain macromolecules, the molecular chain does not contain side chain groups, and the regularity is very good. Its main chain contains rigid benzene ring and flexible hydrocarbon group. The ester group and benzene ring directly connected with the benzene ring form a rigid conjugate system, which restricts the free rotation of the flexible segment. This structure increases the wall and ridge of molecular chain motion, which leads to the higher glass transition temperature of PET. It is necessary to promote the diffusion of dye molecules to the fiber at very high temperature, and complete the dyeing process. In addition, the molecular chains of PET are regular, good crystallinity, tight arrangement of molecular chains, and there are no polar groups on the molecular chains that interact with dye molecules, which makes the colouring of PET fibers more difficult.

Therefore, the normal dyeing of PET fibers under high temperature and high pressure, the choice of disperse dyes dyeing, when the temperature of PET fiber to get glass transition temperature, PET fiber polymer molecule void increased, but its free volume increase is small. The dyeing rate is not high, but the energy consumption and the low dye uptake rate caused by the high temperature and high-pressure method are the main problems now. In addition, the PET fiber is relatively high, which is not conducive to processing.

There are many methods for preparing PET fibers, among which melt spinning is one of the most widely used in industrial production. There are many parameters in the process of melt spinning. These parameters determine the forming process of the fiber and the structure and properties of the spun fiber. In production, the required properties are obtained by controlling these parameters. According to the technological process, the main spinning parameters controlled in production can be summarized as melting condition, spinneret condition, curing condition, winding condition, etc. Among them, the cooling and curing conditions of yarn strip have a decisive effect on the structure and properties of the fiber. In order to control the cooling rate and uniformity of polyester melt, cooling blowing is widely used in production. Cooling and blowing can accelerate the cooling rate of melt fine flow, which is helpful to increase the spinning speed, strengthen the convection of air around the yarn strip, make the inner and outer layer yarn strip cool evenly, and create conditions for the adoption of porous spinneret. Cooling and blowing can improve the quality of primary fiber and improve the tensile properties, which is beneficial to improve the production capacity of the equipment.

For a long time, chemical fiber production has been using side blowing as cooling method. Energy consumption accounts for a large part of the production cost of yarn. With the increasing demand for the properties and quality of chemical fiber, the development of the new product of chemical fiber yarn is developing towards the direction of high value-added differential fiber, which requires higher cooling and blowing conditions, so a ring blowing device is proposed. The ring blowing device not only has the advantage of uniform wind load per bundle, but also has low energy consumption, which effectively solves the problem of wind energy loss caused by the large blowing area.

In the spinning process, although the ring blowing has obvious advantages, there are still some problems: because the spun silk is extruded from the circular spinneret and cooled through the ring blowing, because the number of circular spinneret rings is more, This makes it difficult for the ring to blow into the innermost layer, causing the innermost silk to remain uncooled after the outermost silk has cooled, resulting in problems such as uneven fineness, uneven strength, uneven dyeing, and so on. As a result, the further processing of the silk may be difficult.

SUMMARY

This invention focuses on the disadvantages of prior art, and intends to provide the high-uniformity coloured polyester industrial yarn and its preparation method. The raw material of this industrial yarn introduced in this invention is modified polyester. The branched diol segment is introduced to the molecular chain of the modified polyester. The modified high-uniformity coloured industrial yarn made from the modified polyester, wherein under a certain temperature environment, the increase rate of the space gap between the molecular chain inside the high-uniformity coloured industrial yarn is way larger than that of the unbranched coloured polyester industrial yarn at the same temperature. The melt viscosity of the high-uniformity coloured industrial yarn deceases, helping lower the processing temperature and decrease the degradation rate, which is good for processing. The arrangement of the orifices on the porous spinneret is elliptical. The elliptical arrangement means that the centre of the orifice of the orifice is located on a concentric ellipse, and the concentric ellipse is a series of ellipse, and the long axes of all the ellipse are Line, and the short axis is collinear.

The high-uniformity coloured polyester industrial yarn refers to a polyester industrial yarn with the black masterbatch added, and the high-uniformity coloured polyester industrial yarn is obtained by carrying out solid phase polycondensation, and the raw material of high uniformity coloured polyester industrial yarn is the modified polyester, and the modified polyester is composed of a terephthalic acid segment and ethylene glycol segment and branched diol segment. The branched diol segment refers to a diol having a branched chain which is a non-terminal carbon on the branched diol segment and a branched chain having a linear carbon chain of 5 to 10 carbon atoms. The high-uniformity coloured polyester industrial yarn has a breaking strength of ≥7.0 cN/dtex, a linear density deviation rate of ≤1.0%, and a breaking strength CV value of ≤2.0%. The CV value of elongation at break is ≤5.5%, the melt viscosity of high uniformity coloured polyester industrial yarn is reduced by 10-20% at 260-290° C., and when the test condition is 177° C.×10 min×0.05 cN/dtex The dry heat shrinkage ratio is 2.5±0.5%.

A high-uniformity coloured polyester industrial yarn is made from modified polyester. Introduce branched diol segment to the macromolecular chain of the modified polyester. As we know, the length and quantity of the branch have great influences on the crystallization property and flow behaviour. If the length of the branch chain is too short, we are unable to achieve the purpose of modifying the polyester. If the length is too long, it will cause new entanglement and affect its flow behaviour. When the branch is a linear carbon chain having 5-10 carbon atoms and it is located in a non-terminal carbon, the increase rate of the space gap between the molecular chain inside the high-uniformity coloured polyester industrial yarn prepared by modified polyester under certain temperature condition is far larger than unbranched industrial yarn under the same temperature condition, which is beneficial to reduce the melt viscosity of the industrial yarn and help further processing.

As a preferred technical solution:

The high-uniformity coloured polyester industrial yarn as put forward has an elongation at break of 12.0±1.5%. The number average molecular weight of the modified polyester is 15,000 to 30,000.

The high-uniformity coloured polyester industrial yarn as put forward, the branched diol segment is one or more items selected from the group consisting of a 2-pentyl-1,3 propanediol segment, a 2-hexyl-1,3 propanediol segment, a 2-heptyl-1,3 propanediol segment, a 2-octyl-1,3 propanediol segment, a 2-pentyl-1,4 butanediol segment, a 2-hexyl-1,4 butanediol segment, a 2-heptyl-1,4 butanediol segment, a 2-octyl-1,4 butanediol segment, a 2-pentyl-1,5 pentanediol segment, a 2-hexyl-1,5-pentanediol segment, a 2-heptyl-1,5-pentanediol segment, a 2-octyl-1,5-pentanediol segment, a 2-pentyl-1,6 hexanediol segment, a 2-hexyl-1,6 hexanediol segment, a 2-heptyl-1,6-hexanediol segment, and a 2-octyl-1,6-hexanediol segment. The molar percentage of the branched diol segment to the ethylene glycol segment ranges from 2% to 5%.

The preparation method of the high-uniformity coloured industrial yarn in this invention is that, the modified polyester is subjected to solid phase polycondensation, metering, and adding black masterbatch. After porous spinneret extrusion, cooling, oiling, drawing, heat setting and winding, we can obtain high uniformity coloured polyester industrial yarn.

The arrangement of the orifices on the porous spinneret is elliptical. The elliptical arrangement means that the centre of the orifice of the orifice is located on a concentric ellipse, and the concentric ellipse is a series of ellipse, and the long axes of all the ellipse are Line, and the short axis is collinear.

The preparation process of the modified polyester includes the following steps:

(1) Preparation of Terephthalic Acid Glycol Ester:

Mix terephthalic acid and branched hexanediol to slurry, and carry out the esterification reaction under the catalytic action of concentrated sulfuric acid to obtain a terephthalic acid glycol ester. The branched hexanediol refers to a diol having a branched chain which is a non-terminal carbon on the branched diol segment and a branched chain having a linear carbon chain of 5 to 10 carbon atoms.

(2) Preparation of Ethylene Terephthalate:

Mix the terephthalic acid and the ethylene glycol to slurry, carry out the esterification reaction to obtain ethylene terephthalate.

(3) Preparation of Modified Polyester:

After the esterification reaction in the step (2) is completed, add the terephthalic acid glycol ester prepared in the step (1), stir and mix, run the polycondensation reaction under the action of the catalyst and the stabilizer, and under the condition of the negative pressure. First in a low vacuum stage and then in a high vacuum stage to obtain a modified polyester.

In the preparation method of the high-uniformity coloured polyester industrial yarn as put forward, the specific preparation steps of the modified polyester are as follows:

(1) Preparation of Terephthalic Acid Glycol Ester:

Add the slurry of the terephthalic acid and the branched hexanediol to the reactor, and carry out the esterification reaction under the catalytic action of concentrated sulfuric acid. The esterification reaction is carried out under a pressurized nitrogen environment, and the pressure is normal pressure to 0.3 MPa, and the temperature is 180-240° C. The reaction ends when the water distillation amount in the esterification reaction reaches 90% of the theoretical value or more than that. Then the terephthalic acid glycol ester is obtained.

(2) Preparation of Ethylene Terephthalate:

Add the slurry of the terephthalic acid and ethylene glycol into a reactor and then carry out the esterification reaction. The esterification reaction is carried out under a pressurized nitrogen environment, and the pressure is normal pressure to 0.3 MPa, and the temperature is 250-260° C. The reaction ends when the water distillation amount in the esterification reaction reaches 90% of the theoretical value or more than that. Then the ethylene terephthalate is obtained.

(3) Preparation of Modified Polyester:

After the end of the esterification reaction in the step (2), add the terephthalic acid glycol ester prepared in the step (1), stir and mix for 15-20 minutes under the action of the catalyst and the stabilizer, and a negative pressure. Carry out the polycondensation reaction under the condition of the low-vacuum stage, the pressure is smoothly pumped from normal pressure to an absolute pressure under 500 Pa, the temperature is controlled at 260~270° C., and the reaction time is 30~50 minutes. Then turn to high vacuum stage, the polycondensation reaction continues and the reaction pressure is reduced to an absolute pressure of less than 100 Pa, and the reaction temperature is controlled at 275 to 280° C., and the reaction time is 50 to 90 minutes in order to obtain a modified polyester.

Obtain modified polyester chips by granulate the modified polyester and carry out the solid phase polycondensation of the modified polyester chips in order to make the inherent viscosity of the modified polyester increase to 1.0-1.2 dL/g, which we can call high-viscosity chip. After measuring, adding black masterbatch, extrusion of porous spinneret, cooling oiling, stretching, heat setting and winding, we can obtain high-uniformity coloured polyester industrial yarn.

The mass ratio of the black masterbatch to the modified polyester chips is 0.01%-0.03%.

The main spinning process parameters of the high-uniformity coloured polyester industrial yarn are as follows:
Extrusion temperature: 290-320° C.;
Wind temperature: 20-30° C.;
Winding speed: 2600-3200 m/min.

A method for preparing the high-uniformity coloured polyester industrial yarn as put forward, wherein, in step (1), the molar ratio of terephthalic acid to branched diol is 1:1.3-1.5. The amount of concentrated sulfuric acid added is 0.3-0.5% of the weight of terephthalic acid; The concentration of concentrated sulfuric acid is 50-60 wt %;

In step (2), the molar ratio of terephthalic acid to ethylene glycol is 1:1.2-2.0;

In step (3), the molar percentage value of the diol terephthalate and ethylene terephthalate is 2-5%; the catalyst is antimony trioxide, antimony glycol or antimony acetate, and the amount of catalyst added is 0.01%-0.05% of the total weight of terephthalic acid; The stabilizer is triphenyl phosphate, trimethyl phosphate or trimethyl phosphite, and the amount of stabilizer added is 0.01%-0.05% of the total weight of terephthalic acid;

The method for preparing the high-uniformity coloured polyester industrial yarn as put forward, in which the branched diol is one or more items selected from the group consisting of a 2-pentyl-1,3 propanediol, a 2-hexyl-1,3 propanediol, a 2-heptyl-1,3 propanediol, a 2-octyl-1,3 propanediol, a 2-pentyl-1,4 butanediol, a 2-hexyl-1,4 butanediol, a 2-heptyl-1,4 butanediol, a 2-octyl-1,4 butanediol, a 2-pentyl-1,5 pentanediol, a 2-hexyl-1,5-pentanediol, a 2-heptyl-1,5-pentanediol, a 2-octyl-1,5-pentanediol, a 2-pentyl-1,6 hexanediol segment, a 2-hexyl-1,6 hexanediol, a 2-heptyl-1,6-hexanediol, and a 2-octyl-1,6-hexanediol.

The method for preparing a high uniformity coloured polyester industrial yarn as put forward, wherein the spinneret is a circular spinneret or an elliptical spinneret. The difference between the diameter of the circular spinneret and the maximum length of the long axis of the series ellipse is greater than 10 mm, and the difference value between the elliptical spinneret and the maximum length of the long axis of the series ellipse is greater than 10 mm.

A preparation method of a high-uniformity coloured polyester industrial yarn as put forward, wherein the arrangement of the spinneret holes is long axis and/or short axis symmetry. the ratio of the long axis of the ellipse to the length of the short axis is 1.3-1.8. The spacing of the adjacent spinneret holes is greater than the diameter of the guide hole equal to the diameter of the guide hole of the spinneret hole plus 1.5 mm.

When the effective area of the spinneret is the same, since the circumference of the elliptical shape is larger than the circumference of the circle, the number of layers of the elliptical array of the spinneret holes is smaller than the number of layers of the circular array, and the number of holes of the spinneret ellipse is larger than the number of holes arranged in a circular shape, therefore, the elliptical arrangement of the spinning holes facilitates the cooling of the ring blowing, improves the cooling efficiency of the ring blowing, and the fiber properties are also better. The closer the ratio of the length of the long axis to the short axis is to 1, the closer the ellipse is to the circle. The difference between the cooling efficiency and the cooling effect is not large. When the ratio of the length of the long axis to the short axis is 1.3, the cooling effect is significantly improved, and the number of holes per layer is increased. A corresponding increase of 16%. When the ratio of the length of the long axis to the short axis is 1.8, the cooling effect is greatly improved, and the number of holes per layer is correspondingly increased by 33%. In the case of the same number of holes, the elliptical arrangement of the present invention is arranged in a conventional concentric arrangement. The number of turns is reduced, and the cooling air is easily blown, so that the fiber cooling conditions of the inner and outer rings are more uniform; when the ratio of the length of the long axis to the short axis is greater than 1.8, the ellipse tends to form a flat shape, which is difficult to punch holes, and the cooling effect is no longer increased. high. Therefore, the ratio of the length of the long axis to the length of the short axis of the series ellipse is 1.3 to 1.8, which can achieve higher cooling efficiency and better cooling effect.

The method for preparing a high-uniformity coloured polyester industrial yarn as put forward, wherein the guide hole diameter of the spinneret is 1.5-2.5 mm; the number of spinneret holes is greater than or equal to 192, and the cross-section shape of the spinneret spinning hole is one kind of circular, square, diamond, straight line, triangular, trilobal, hollow or flat.

The principles of this invention are:

The raw material of the high-uniformity coloured polyester industrial yarn of the invention is a modified polyester. When the temperature is higher than the glass transition temperature, the branch of the branched polyester diol segment contained in the modified polyester macromolecule, moves before the main chain does, making the increase of the free volume much larger than that of the unbranched polyester macromolecular chain. The free volume of the industrial yarn made from the modified polyester is far larger than the unbranched industrial yarn at the same temperature, which is beneficial to lower the melt viscosity.

The arrangement of the orifices on the spinneret of the invention is elliptical. When the effective area of the spinneret is the same, the number of layers of the orifices in the elliptical arrangement is smaller than the number of layers arranged in the circle, and the ring blower is more easily blown through the spinning flow, so the spinning flow can have a better cooling effect, and the obtained industrial yarn is also better. When the effective areas of the spinneret are the same, the number of holes in the elliptical shape of the spinneret hole is larger than the number of holes arranged in the circle, and the elliptical arrangement can lead to an improved cooling efficiency.

Benefits

The raw material of the high-uniformity coloured polyester industrial yarn of the invention is a modified polyester. When the temperature is higher than the glass transition temperature, the branch of the branched polyester diol segment contained in the modified polyester macromolecule, moves before the main chain does, making the increase of the free volume much larger than that of the unbranched polyester macromolecular chain. The increase of the free volume of the industrial yarn is beneficial to reduce its melt viscosity and improve the performance of the industrial yarn while being processed.

The raw material of the high-uniformity coloured polyester industrial yarn obtained by the invention is the modified polyester, and the introduction of the branched diol segment doesn't make great damage to the completion of the structure of the modified polyester, keeping excellent performance of the polyester fiber.

The arrangement of the spinnerets of the high uniformity coloured polyester industrial yarn in the present invention is elliptical. When the effective areas of the spinneret are the same, the number of layers of the spinneret elliptical is smaller than that of the circular array. The number of rings makes it easier to blow through the spinning flow, the cooling effect of the spinning flow is better, and the performance of the obtained fiber is also better.

The arrangement of the spinning holes of the high uniformity coloured polyester industrial yarn spinneret in the present invention is elliptical. When the effective areas of the spinneret are the same, the number of holes in the elliptical shape of the spinneret hole is larger than the number of holes arranged in the circle, and the elliptical arrangement can lead to greater degree of cooling, and an improved cooling efficiency.

DETAILED DESCRIPTION OF THE EMBODIMENTS

Hereinafter, the present invention will be described in more detail by the following examples. It should be noticed that these examples are only for illustrating the present invention and are not intended to limit the scope of the present invention. In addition, it should be noticed that after reading the content of the present invention, those skilled in this field can make various modifications or changes to the present invention, and these equivalent forms also apply to the scope of the appended Claims of this application.

Examples 1-28

A preparation method of a modified polyester, including the following steps:

(1) Preparation of Terephthalic Acid Glycol Esters:

Add the terephthalic acid and B at a molar ratio of A as a mixture into the reactor at a concentration of C wt %, and the amount added is D % by weight of terephthalic acid. Under the catalysis of sulfuric acid, the esterification reaction is carried out. The esterification reaction is pressurized to E MPa under a nitrogen environment, the pressure is normal pressure, the temperature is F° C. The esterification reaction ends until the water distillation amount in the esterification reaction reaches G % of the theoretical value, and the terephthalic acid glycol ester is obtained.

(2) Preparation of Ethylene Terephthalate:

The terephthalic acid and ethylene glycol having a molar ratio of H are mixed into the reactor, and then the esterification reaction is carried out. The esterification reaction is pressurized to I MPa under a nitrogen environment, and a temperature of F° C. When the water distillation amount in the esterification reaction reaches K % of the theoretical value, the esterification reaction ends, and ethylene terephthalate is obtained;

(3) Preparation of Modified Polyester:

Add the terephthalate diol phthalate ester diol prepared in step (1) after completion of the esterification reaction in step (2). The molar percentage of terephthalate diol phthalate ester diol and ethylene glycol terephthalate is of L %. Stir and mix for M minutes. Add N % of 0 as catalyst in a total amount of terephthalic acid and P % of Q as stabilizer in a total amount of terephthalic acid. The polycondensation reaction in the low vacuum phase is started under the condition of negative pressure. The pressure is smoothly pumped from atmospheric pressure to an absolute pressure of R Pa, the temperature is controlled at S ° C., and the reaction time is T minutes, then the vacuum is continued for the high vacuum phase. The polycondensation reaction is carried out to reduce the reaction pressure to an absolute pressure of U Pa, the reaction temperature is controlled at V ° C., and the reaction time is W minutes. Then we can obtain the modified polyester.

The modified polyester obtained has a number average molecular weight of X and consists of terephthalic acid segment, ethylene glycol segment and branched B segment. The molar percentage of branched B segment and the ethylene glycol segment is Y %.

The parameters of the variation in the different examples are shown in the following table. In the table, "BA" stands for 2-pentyl-1,3 propanediol, "BB" stands for 2-hexyl-1,3 propanediol, and "BC" stands for 2-Heptyl-1,3 propanediol, "BD" stands for 2-octyl-1,3 propanediol, "BE" stands for 2-mercapto-1,3 propanediol, and "BF" stands for 2-mercapto-1. 3 propylene glycol, "BG" stands for 2-pentyl-1,4 butanediol, "BH" stands for 2-hexyl-1,4 butanediol, and "BI" stands for 2-heptyl-1,4 The diol, "BJ" stands for 2-octyl-1,4 butanediol, "BK" stands for 2-mercapto-1,4 butanediol, and "BL" stands for 2-mercapto-1,4 Butanediol, "BM" stands for 2-pentyl-1,5-pentanediol, "BN" stands for 2-hexyl-1,5-pentanediol, and "BO" stands for 2-heptyl-1,5 Pentyl glycol, "BP" stands for 2-octyl-1,5 pentanediol, "BQ" stands for 2-mercapto-1,5 pentanediol, and "BR" stands for 2-mercapto-1. 5 pentanediol, "BS" represents 2-pentyl-1,6 hexanediol, "BT" represents 2-hexyl-1, 6 hexanediol, and "BU" represents 2-heptyl-1, 6 hexanediol, "BV" stands for 2-octyl-1,6 hexanediol, "BW" stands for 2-mercapto-1,6-hexanediol, "BX" represents 2-mercapto-1, 6-hexanediol, "OA" stands for antimony trioxide, "OB" stands for ethylene glycol, and "OC" stands for Barium acetate, "QA" stands for triphenyl phosphate, "QB" stands for trimethyl phosphate, and "QC" stands for trimethyl phosphite, and the ratio is molar ratio.

TABLE 1 parameters of the variation in the different examples

| EXAMPLE | A | B | C | D | E | F | G | H | I | J | K | L | M | N | O | P | Q | R | S | T | U | V | W | X | Y |
|---|---|---|---|---|---|---|---|---|---|---|---|---|---|---|---|---|---|---|---|---|---|---|---|---|---|
| 1 | 1:1.3 | BA | 50 | 0.3 | 0.1 | 180 | 90 | 1:1.2 | 0.1 | 250 | 90 | 2 | 15 | 0.01 | OA | 0.01 | QA | 500 | 260 | 30 | 100 | 275 | 50 | 15000 | 2 |
| 2 | 1:1.38 | BB | 55 | 0.32 | 0.13 | 181 | 91 | 1:1.3 | 0.12 | 251 | 91 | 2.1 | 16 | 0.011 | OA | 0.02 | QA | 490 | 262 | 31 | 99 | 276 | 51 | 16000 | 2.1 |
| 3 | 1:1.33 | BC | 55 | 0.33 | 0.12 | 183 | 92 | 1:1.31 | 0.31 | 252 | 92 | 2.2 | 16 | 0.03 | OA | 0.02 | QA | 498 | 263 | 32 | 80 | 277 | 57 | 15900 | 2.2 |
| 4 | 1:1.34 | BD | 60 | 0.34 | 0.13 | 184 | 93 | 1:1.32 | 0.33 | 253 | 93 | 2.3 | 17 | 0.033 | OA | 0.023 | QA | 497 | 264 | 33 | 80 | 278 | 58 | 15800 | 2.3 |
| 5 | 1:1.35 | BE | 55 | 0.36 | 0.14 | 185 | 93.2 | 1:1.33 | 0.14 | 254 | 93.2 | 2.4 | 17 | 0.034 | OA | 0.024 | QA | 496 | 265 | 34 | 80 | 277 | 59 | 15900 | 2.4 |
| 6 | 1:1.36 | BF | 50 | 0.37 | 0.15 | 186 | 93.3 | 1:1.34 | 0.15 | 255 | 93.3 | 2.5 | 18 | 0.035 | OA | 0.025 | QA | 495 | 266 | 35 | 70 | 278 | 60 | 16000 | 2.5 |
| 7 | 1:1.37 | BG | 60 | 0.38 | 0.16 | 187 | 93.4 | 1:1.36 | 0.16 | 256 | 93.4 | 2.6 | 19 | 0.036 | OA | 0.025 | QA | 496 | 267 | 36 | 70 | 278 | 61 | 16000 | 2.6 |
| 8 | 1:1.38 | BH | 55 | 0.39 | 0.17 | 188 | 93.5 | 1:1.37 | 0.17 | 257 | 93.5 | 2.7 | 19 | 0.036 | OA | 0.025 | QA | 496 | 267 | 36 | 60 | 278 | 61 | 17000 | 2.7 |
| 9 | 1:1.39 | BI | 50 | 0.4 | 0.17 | 188 | 93.5 | 1:1.37 | 0.17 | 257.8 | 93.5 | 2.8 | 19 | 0.04 | OA | 0.026 | QB | 497 | 268 | 38 | 50 | 279 | 62 | 18000 | 2.8 |
| 10 | 1:1.4 | BJ | 55 | 0.4 | 0.17 | 188 | 93.5 | 1:1.38 | 0.18 | 258.8 | 93.6 | 3 | 16 | 0.03 | OA | 0.027 | QB | 498 | 269 | 39 | 50 | 278 | 62 | 18000 | 3 |
| 11 | 1:1.4 | BK | 55 | 0.4 | 0.18 | 189 | 93.6 | 1:1.39 | 0.19 | 258 | 94 | 4 | 17 | 0.04 | OB | 0.03 | QB | 497 | 260 | 40 | 40 | 277 | 63 | 19000 | 4 |
| 12 | 1:1.4 | BL | 55 | 0.4 | 0.2 | 200 | 94 | 1:1.6 | 0.2 | 256 | 92 | 4 | 18 | 0.038 | OB | 0.03 | QC | 497 | 265 | 42 | 40 | 277 | 70 | 26000 | 4 |
| 13 | 1:1.5 | BM | 60 | 0.5 | 0.3 | 240 | 92 | 1:2.0 | 0.3 | 260 | 92 | 5 | 20 | 0.05 | OC | 0.05 | QC | 450 | 270 | 50 | 30 | 280 | 90 | 30000 | 5 |
| 14 | 1:1.47 | BN | 60 | 0.47 | 0.28 | 220 | 92 | 1:1.8 | 0.27 | 258 | 92 | 4 | 18 | 0.04 | OB | 0.04 | QB | 460 | 263 | 47 | 40 | 278 | 85 | 28000 | 4 |
| 15 | 1:1.46 | BO | 60 | 0.49 | 0.28 | 233 | 92 | 1:1.8 | 0.28 | 259 | 92 | 4.5 | 19 | 0.044 | OA | 0.046 | QA | 490 | 269 | 48 | 40 | 279 | 87 | 29000 | 4.5 |
| 16 | 1:1.49 | BP | 60 | 0.48 | 0.28 | 230 | 92 | 1:1.8 | 0.28 | 259 | 92 | 4.7 | 19 | 0.048 | OB | 0.047 | QC | 460 | 267 | 48 | 40 | 279 | 83 | 27000 | 4.7 |
| 17 | 1:1.467 | BQ | 60 | 0.47 | 0.27 | 236 | 92 | 1:1.89 | 0.28 | 258 | 92 | 4.3 | 18 | 0.04 | OB | 0.041 | QC | 490 | 268 | 48 | 40 | 278 | 85 | 29000 | 4.3 |
| 18 | 1:1.48 | BR | 55 | 0.46 | 0.28 | 230 | 92 | 1:1.88 | 0.28 | 256 | 92 | 4.7 | 18 | 0.04 | OA | 0.047 | QA | 480 | 265 | 47 | 40 | 279 | 85 | 28000 | 4.7 |
| 19 | 1:1.46 | BS | 55 | 0.47 | 0.28 | 238 | 92 | 1:1.9 | 0.28 | 259 | 92 | 4.7 | 19 | 0.047 | OC | 0.048 | QC | 446 | 267 | 49 | 40 | 278 | 87 | 29000 | 4.7 |
| 20 | 1:1.46 | BT | 60 | 0.46 | 0.26 | 221 | 92 | 1:1.89 | 0.25 | 259 | 92 | 4.1 | 18 | 0.046 | OB | 0.042 | QB | 460 | 265 | 47 | 40 | 278 | 85 | 28000 | 4.1 |
| 21 | 1:1.43 | BU | 60 | 0.47 | 0.27 | 235 | 92 | 1:1.78 | 0.26 | 255 | 92 | 4.3 | 18 | 0.041 | OB | 0.049 | QB | 490 | 268 | 46 | 40 | 275 | 85 | 28000 | 4.3 |
| 22 | 1:1.43 | BV | 55 | 0.45 | 0.27 | 235 | 92 | 1:1.87 | 0.26 | 255 | 92 | 4.6 | 17 | 0.043 | OB | 0.04 | QA | 470 | 268 | 45 | 40 | 279 | 83 | 29000 | 4.6 |
| 23 | 1:1.457 | BW | 55 | 0.46 | 0.29 | 239 | 92 | 1:1.81 | 0.27 | 255 | 92 | 4.41 | 18 | 0.047 | OA | 0.048 | QA | 495 | 265 | 45 | 50 | 275 | 85 | 28000 | 4.41 |
| 24 | 1:1.47 | BX | 55 | 0.48 | 0.27 | 245 | 92 | 1:1.81 | 0.27 | 255 | 92 | 4.67 | 19 | 0.042 | OA | 0.042 | QC | 485 | 268 | 46 | 50 | 275 | 89 | 29000 | 4.67 |
| 25 | 1:1.45 | BW + BX (3:1) | 55 | 0.49 | 0.26 | 236 | 92 | 1:1.8 | 0.28 | 258 | 92 | 4.4 | 18 | 0.042 | OA | 0.047 | QC | 495 | 265 | 49 | 50 | 278 | 88 | 29000 | 4.4 |
| 26 | 1:1.45 | BO + BX (3:2) | 60 | 0.45 | 0.28 | 239 | 92 | 1:1.84 | 0.29 | 255 | 92 | 4.6 | 18 | 0.0423 | OA | 0.045 | QC | 495 | 265 | 45 | 50 | 278 | 85 | 28000 | 4.6 |
| 27 | 1:1.45 | BW + BG (3:1) | 55 | 0.49 | 0.26 | 236 | 96 | 1:1.8 | 0.28 | 258 | 92 | 4.4 | 18 | 0.042 | OA | 0.047 | QC | 495 | 265 | 49 | 50 | 278 | 88 | 29000 | 4.4 |
| 28 | 1:1.45 | BD + BG + BQ (3:2:1) | 60 | 0.47 | 0.29 | 235 | 92 | 1:1.8 | 0.27 | 258 | 92 | 4.71 | 18 | 0.04 | OA | 0.041 | QC | 490 | 268 | 49 | 50 | 277 | 84 | 29000 | 4.71 |

Example 29

In the preparation method of the high-uniformity coloured polyester industrial yarn, the high-uniformity coloured polyester industrial yarn is obtained by using the porous spinneret. The arrangement of the spinning holes on the spinneret is elliptical. The elliptical arrangement refers to that the centres of spinning holes are on the concentric ellipses. The concentric ellipses are a series of ellipses, all of which have the same long axis and the short axis.

Figure 1:
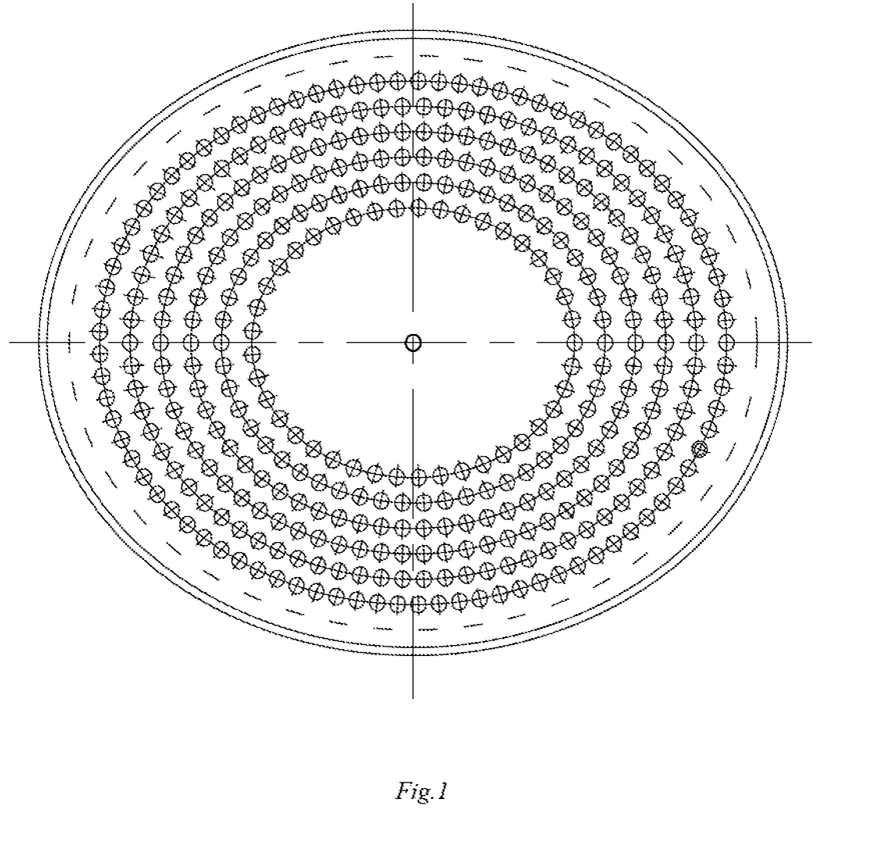
FIG. 1 is an elliptical arrangement diagram of 374 spinnerets, the orifice diameter is 2.0 mm, and the length ratio of the long axis of the ellipse to the short axis is 1.3.

As shown in FIG. 1 the ratio of the long axis to short axis of the ellipse is 1.3, and the spacing between the neighbouring spinning holes equals to the diameter of the guide holes of the spinning holes plus 1.5 mm. The spinnerets are circle spinneret and the diameter of the spinnerets has a difference of 11 mm to the longest long axis of the series of ellipses. The diameter of guide holes of the spinning holes is 2.0 mm. The number of spinning holes is 374, and the cutting shape of the micro spinning holes is circular.

After processing the modified polyester prepared in EXAMPLE 1 by solid phase polycondensation, measuring, adding black masterbatch, porous spinneret extrusion, cooling, oiling, stretching, heat setting, and winding, we can obtain the high-uniformity coloured polyester industrial yarn. The temperature of extrusion is 290° C., the cooling wind temperature is 20° C., the winding speed is 2600 m/min, the added content of black masterbatch is of 0.01% of the mass of the modified polyester chips. The high-uniformity coloured industrial yarn has the breaking strength of 7.3 cN/dtex, the deviation of fiber density of 0.6%, the CV value of the breaking strength of 1.8%, the CV value of the elongation at break of 4.5%, and the elongation at break is 11.0. At the temperature of 260° C., the melt viscosity decreases by 11%. Under the condition of 177° C.×10 min×0.05 cN/dtex, the dry heat shrinkage rate is 2.5%.

Example 30

In the preparation method of the high-uniformity coloured polyester industrial yarn, the high-uniformity coloured polyester industrial yarn is obtained by using the porous spinneret. The arrangement of the spinning holes on the spinneret is elliptical. The elliptical arrangement refers to that the centres of spinning holes are on the concentric ellipses. The concentric ellipses are a series of ellipses, all of which have the same long axis and the short axis.

Figure 3:
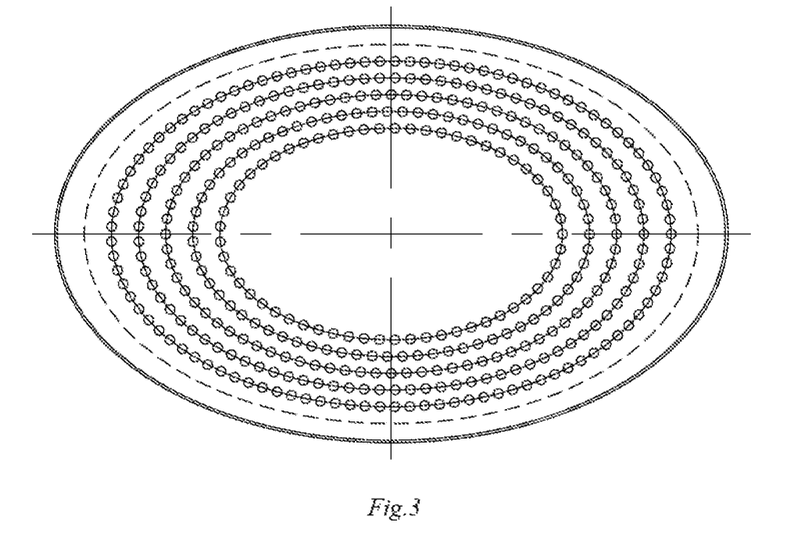
FIG. 3 is an elliptical arrangement of 382 spinnerets with a hole diameter of 2.0 mm and a length ratio of the long axis to the short axis of 1.6.

As shown in FIG. 3 the ratio of the long axis to short axis of the ellipse is 1.6, and the spacing between the neighbouring spinning holes equals to the diameter of the guide holes of the spinning holes plus 1.5 mm. The spinnerets are circle spinneret and the diameter of the spinnerets has a difference of 11 mm to the longest long axis of the series of ellipses. The diameter of guide holes of the spinning holes is 2.0 mm. The number of spinning holes is 382, and the cutting shape of the micro spinning holes is circular.

After processing the modified polyester prepared in EXAMPLE 1 by solid phase polycondensation, measuring, adding black masterbatch, porous spinneret extrusion, cooling, oiling, stretching, heat setting, and winding, we can obtain the high-uniformity coloured polyester industrial yarn. The temperature of extrusion is 290° C., the cooling wind temperature is 20° C., the winding speed is 2600 m/min, the added content of black masterbatch is of 0.01% of the mass of the modified polyester chips. The high-uniformity coloured industrial yarn has the breaking strength of 7.2 cN/dtex, the deviation of fiber density of 0.7%, the CV value of the breaking strength of 1.7%, the CV value of the elongation at break of 4.8%, and the elongation at break is 11.0. At the temperature of 260° C., the melt viscosity decreases by 11%. Under the condition of 177° C.×10 min×0.05 cN/dtex, the dry heat shrinkage rate is 2.5%.

Comparative Example 1

Figure 2:
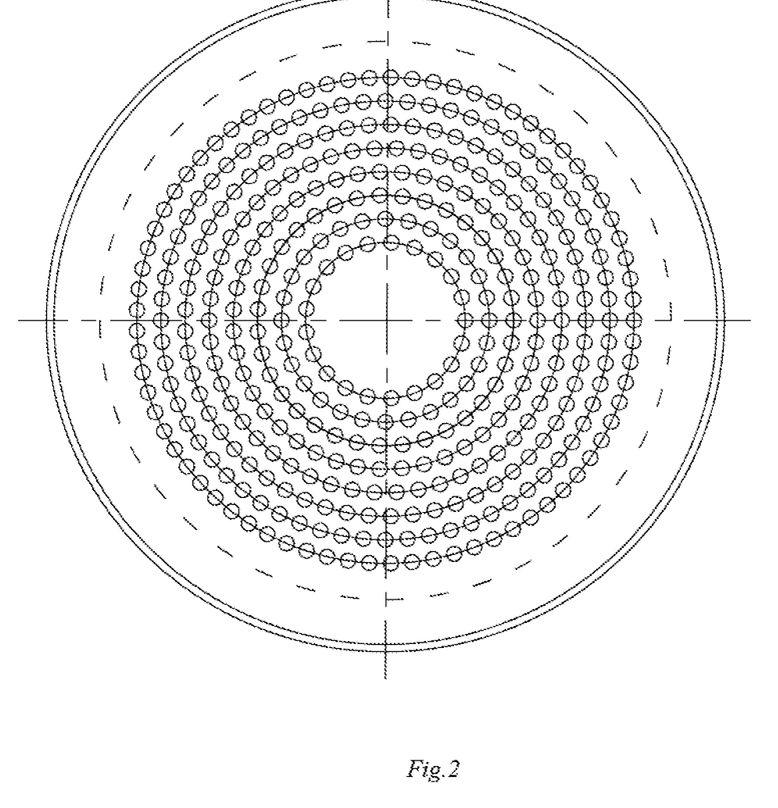
FIG. 2 is a circular arrangement diagram of 370 orifices, the orifice diameter is 2.0 mm.

In the preparation method of the high-uniformity coloured polyester industrial yarn, the high-uniformity coloured polyester industrial yarn is obtained by using the porous spinneret. The arrangement of the spinning holes on the spinneret is circular. The circular arrangement refers to that the centres of spinning holes are on the concentric circles. The concentric circles are a series of circles. As shown in FIG. 2 the spacing between the neighbouring spinning holes equals to the diameter of the guide holes of the spinning holes plus 1.5 mm. The spinnerets are circle spinneret and the diameter of the spinnerets has a difference of 11 mm to the longest diameters of the series of circles. The diameter of guide holes of the spinning holes is 2.0 mm. The number of spinning holes is 370, and the cutting shape of the micro spinning holes is circular.

After processing the modified polyester prepared in EXAMPLE 1 by solid phase polycondensation, measuring, adding black masterbatch, porous spinneret extrusion, cooling, oiling, stretching, heat setting, and winding, we can obtain the high-uniformity coloured polyester industrial yarn. The temperature of extrusion is 290° C., the cooling wind temperature is 20° C., the winding speed is 2600 m/min, the added content of black masterbatch is of 0.01% of the mass of the modified polyester chips. The high-uniformity coloured industrial yarn has the breaking strength of 7.6 cN/dtex, the deviation of fiber density of 1%, the CV value of the breaking strength of 1.9%, the CV value of the elongation at break of 5.3%, and the elongation at break is 12.0. At the temperature of 260° C., the melt viscosity decreases by 11%. Under the condition of 177° C.×10 min×0.05 cN/dtex, the dry heat shrinkage rate is 2.75%.

Compared to the EXAMPLE 29, we can draw the conclusion that when the effective areas of the spinneret are the same and the number of the spinning holes are similar (the number of spinning holes by circular arrangement is 370 and the number of spinning holes by elliptical arrangement is 374), the number of layers by elliptical arrangement is 5, smaller than that by circular arrangement which is 8, resulting in better cooling effects. The number of spinning holes by elliptical arrangements (382) is larger than that by circular arrangement (370), resulting in higher cooling efficiency. The result of comparison shows that, the deviation of fiber density, CV value of breaking strength, CV value of elongation at break in COMPARATIVE EXAMPLE 1 are all higher than those in EXAMPLE 29 and EXAMPLE 30, which means that under the same process conditions, the fiber obtained by spinneret using the elliptical arrangement has better fiber performance than that of the fiber obtained by spinneret using the circular arrangement.

Example 31-33

In the preparation method of the high-uniformity coloured polyester industrial yarn, the high-uniformity coloured polyester industrial yarn is obtained by using the porous spinneret. The arrangement of the spinning holes on the spinneret is elliptical. The elliptical arrangement refers to that the centres of spinning holes are on the concentric ellipses. The concentric ellipses are a series of ellipses, all of which have the same long axis and the short axis.

The ratio of the long axis to short axis of the ellipse is 1.4, and the spacing between the neighbouring spinning holes equals to the diameter of the guide holes of the spinning holes plus 1.6 mm. The spinnerets are circle spinneret and the diameter of the spinnerets has a difference of 12 mm to the longest long axis of the series of ellipses. The diameter of guide holes of the spinning holes is 1.5 mm. The number of spinning holes is 384, and the cutting shape of the micro spinning holes is square.

After processing the modified polyester by solid phase polycondensation, measuring, adding black masterbatch, porous spinneret extrusion, cooling, oiling, stretching, heat setting, and winding, we can obtain the high-uniformity coloured polyester industrial yarn. The temperature of extrusion is 290° C., the cooling wind temperature is 30° C., the winding speed is 3100 m/min, the added content of black masterbatch is of 0.03% of the mass of the modified polyester chips. The high-uniformity coloured industrial yarn's mechanical properties, the melt viscosity drop rate at the temperature of 280° C., and the dry heat shrinkage rate of the industrial yarn under the condition of 177° C.×10 min×0.05 cN/dtex are shown in the table below.

ester industrial yarn is obtained by using the porous spinneret. The arrangement of the spinning holes on the spinneret is elliptical. The elliptical arrangement refers to that the centres of spinning holes are on the concentric ellipses. The concentric ellipses are a series of ellipses, all of which have the same long axis and the short axis.

The ratio of the long axis to short axis of the ellipse is 1.4, and the spacing between the neighbouring spinning holes equals to the diameter of the guide holes of the spinning holes plus 1.6 mm. The spinnerets are circle spinneret and the diameter of the spinnerets has a difference of 12 mm to the longest long axis of the series of ellipses. The diameter of guide holes of the spinning holes is 1.5 mm. The number of spinning holes is 192, and the cutting shape of the micro spinning holes is square.

After processing the modified polyester by solid phase polycondensation, measuring, adding black masterbatch, porous spinneret extrusion, cooling, oiling, stretching, heat setting, and winding, we can obtain the high-uniformity coloured polyester industrial yarn. The temperature of extrusion is 290° C., the cooling wind temperature is 22° C., the winding speed is 3200 m/min, the added content of black masterbatch is of 0.02% of the mass of the modified polyester chips. The high-uniformity coloured industrial yarn's mechanical properties, the melt viscosity drop rate at the temperature of 290° C., and the dry heat shrinkage rate of the industrial yarn under the condition of 177° C.×10 min×0.05 cN/dtex are shown in the table below.

TABLE 2 the high-uniformity coloured industrial yarn's mechanical properties, the melt viscosity drop rate at the temperature of 280° C., and the dry heat shrinkage rate of the industrial yarn under the condition of 177° C. × 10 min × 0.05 cN/dtex

| Example | Modified polyester source | Breaking strength (cN/dtex) | Elongation at break (%) | Melt viscosity drop value (%) | fiber density deviation rate (%) | CV value of breaking strength (%) | CV value of elongation at break (%) | Dry heat shrinkage rate (%) |
|---|---|---|---|---|---|---|---|---|
| 31 | Example 2 | 7.4 | 10 | 10 | 1.0 | 2.0 | 5.5 | 3 |
| 32 | Example 3 | 7.5 | 11.5 | 15 | 0.6 | 1.8 | 4.6 | 2 |
| 33 | Example 4 | 7.3 | 12.2 | 20 | 0.5 | 1.0 | 4.3 | 2.5 |

Example 34-36

In the preparation method of the high-uniformity coloured polyester industrial yarn, the high-uniformity coloured poly-

TABLE 3 the high-uniformity coloured industrial yarn's mechanical properties, the melt viscosity drop rate at the temperature of 290° C., and the dry heat shrinkage rate of the industrial yarn under the condition of 177° C. × 10 min × 0.05 cN/dtex

| Example | Modified polyester source | Breaking strength (cN/dtex) | Elongation at break (%) | Melt viscosity drop value (%) | fiber density deviation rate (%) | CV value of breaking strength (%) | CV value of elongation at break (%) | Dry heat shrinkage rate (%) |
|---|---|---|---|---|---|---|---|---|
| 34 | Example 5 | 7.4 | 10.0 | 10 | 0.8 | 1.8 | 4.0 | 2.6 |
| 35 | Example 6 | 7.6 | 11.5 | 11 | 0.7 | 1.5 | 4.6 | 2.9 |
| 36 | Example 7 | 7.4 | 13.4 | 16 | 0.6 | 1.4 | 4.8 | 2 |

Example 37-39

In the preparation method of the high-uniformity coloured polyester industrial yarn, the high-uniformity coloured polyester industrial yarn is obtained by using the porous spinneret. The arrangement of the spinning holes on the spinneret is elliptical. The elliptical arrangement refers to that the centres of spinning holes are on the concentric ellipses. The concentric ellipses are a series of ellipses, all of which have the same long axis and the short axis.

The ratio of the long axis to short axis of the ellipse is 1.4, and the spacing between the neighbouring spinning holes equals to the diameter of the guide holes of the spinning holes plus 1.6 mm. The spinnerets are circle spinneret and the diameter of the spinnerets has a difference of 12 mm to the longest long axis of the series of ellipses. The diameter of guide holes of the spinning holes is 1.5 mm. The number of spinning holes is 288, and the cutting shape of the micro spinning holes is square.

After processing the modified polyester by solid phase polycondensation, measuring, adding black masterbatch, porous spinneret extrusion, cooling, oiling, stretching, heat setting, and winding, we can obtain the high-uniformity coloured polyester industrial yarn. The temperature of extrusion is 310° C., the cooling wind temperature is 28° C., the winding speed is 3000 m/min, the added content of black masterbatch is of 0.025% of the mass of the modified polyester chips. The high-uniformity coloured industrial yarn's mechanical properties, the melt viscosity drop rate at the temperature of 270° C., and the dry heat shrinkage rate of the industrial yarn under the condition of 177° C.×10 min×0.05 cN/dtex are shown in the table below.

The concentric ellipses are a series of ellipses, all of which have the same long axis and the short axis.

The ratio of the long axis to short axis of the ellipse is 1.4, and the spacing between the neighbouring spinning holes equals to the diameter of the guide holes of the spinning holes plus 1.6 mm. The spinnerets are circle spinneret and the diameter of the spinnerets has a difference of 12 mm to the longest long axis of the series of ellipses. The diameter of guide holes of the spinning holes is 1.5 mm. The number of spinning holes is 192, and the cutting shape of the micro spinning holes is square.

After processing the modified polyester by solid phase polycondensation, measuring, adding black masterbatch, porous spinneret extrusion, cooling, oiling, stretching, heat setting, and winding, we can obtain the high-uniformity coloured polyester industrial yarn. The temperature of extrusion is 300° C., the cooling wind temperature is 28° C., the winding speed is 3000 m/min, the added content of black masterbatch is of 0.02% of the mass of the modified polyester chips. The high-uniformity coloured industrial yarn's

TABLE 4 the high-uniformity coloured industrial yarn's mechanical properties, the melt viscosity drop rate at the temperature of 270° C., and the dry heat shrinkage rate of the industrial yarn under the condition of 177° C. × 10 min × 0.05 cN/dtex

| Example | Modified polyester source | Breaking strength (cN/dtex) | Elongation at break (%) | Melt viscosity drop value (%) | fiber density deviation rate (%) | CV value of breaking strength (%) | CV value of elongation at break (%) | Dry heat shrinkage rate (%) |
|---|---|---|---|---|---|---|---|---|
| 37 | Example 8 | 7.3 | 12.0 | 10 | 0.5 | 2.0 | 4.9 | 3 |
| 38 | Example 9 | 7.4 | 13.2 | 18 | 0.7 | 1.8 | 4.6 | 2.7 |
| 39 | Example 10 | 7.4 | 12.5 | 17 | 0.9 | 1.7 | 5.3 | 2.9 |

Example 40-42

In the preparation method of the high-uniformity coloured polyester industrial yarn, the high-uniformity coloured polyester industrial yarn is obtained by using the porous spinneret. The arrangement of the spinning holes on the spinneret is elliptical. The elliptical arrangement refers to that the centres of spinning holes are on the concentric ellipses.

mechanical properties, the melt viscosity drop rate at the temperature of 260° C., and the dry heat shrinkage rate of the industrial yarn under the condition of 177° C.×10 min×0.05 cN/dtex are shown in the table below.

TABLE 5 the high-uniformity coloured industrial yarn's mechanical properties, the melt viscosity drop rate at the temperature of 260° C., and the dry heat shrinkage rate of the industrial yarn under the condition of 177° C. × 10 min × 0.05 cN/dtex

| Example | Modified polyester source | Breaking strength (cN/dtex) | Elongation at break (%) | Melt viscosity drop value (%) | fiber density deviation rate (%) | CV value of breaking strength (%) | CV value of elongation at break (%) | Dry heat shrinkage rate (%) |
|---|---|---|---|---|---|---|---|---|
| 40 | Example 10 | 7.2 | 11.0 | 10 | 0.5 | 2.0 | 5.0 | 2.7 |
| 41 | Example 11 | 7.3 | 10.5 | 11 | 0.7 | 1.8 | 4.8 | 2.05 |
| 42 | Example 12 | 7.5 | 13.5 | 11.7 | 0.6 | 1.4 | 4.6 | 2.8 |

Example 43-45

In the preparation method of the high-uniformity coloured polyester industrial yarn, the high-uniformity coloured polyester industrial yarn is obtained by using the porous spinneret. The arrangement of the spinning holes on the spinneret is elliptical. The elliptical arrangement refers to that the centres of spinning holes are on the concentric ellipses. The concentric ellipses are a series of ellipses, all of which have the same long axis and the short axis.

The ratio of the long axis to short axis of the ellipse is 1.4, and the spacing between the neighbouring spinning holes equals to the diameter of the guide holes of the spinning holes plus 1.6 mm. The spinnerets are circle spinneret and the diameter of the spinnerets has a difference of 12 mm to the longest long axis of the series of ellipses. The diameter of guide holes of the spinning holes is 1.5 mm. The number of spinning holes is 244, and the cutting shape of the micro spinning holes is square.

After processing the modified polyester by solid phase polycondensation, measuring, adding black masterbatch, porous spinneret extrusion, cooling, oiling, stretching, heat setting, and winding, we can obtain the high-uniformity coloured polyester industrial yarn. The temperature of extrusion is 290° C., the cooling wind temperature is 30° C., the winding speed is 3100 m/min, the added content of black masterbatch is of 0.018% of the mass of the modified polyester chips. The high-uniformity coloured industrial yarn's mechanical properties, the melt viscosity drop rate at the temperature of 280° C., and the dry heat shrinkage rate of the industrial yarn under the condition of 177° C.×10 min× 0.05 cN/dtex are shown in the table below.

equals to the diameter of the guide holes of the spinning holes plus 1.6 mm. The spinnerets are circle spinneret and the diameter of the spinnerets has a difference of 12 mm to the longest long axis of the series of ellipses. The diameter of guide holes of the spinning holes is 1.5 mm. The number of spinning holes is 192, and the cutting shape of the micro spinning holes is square.

After processing the modified polyester by solid phase polycondensation, measuring, adding black masterbatch, porous spinneret extrusion, cooling, oiling, stretching, heat setting, and winding, we can obtain the high-uniformity coloured polyester industrial yarn. The temperature of extrusion is 310° C., the cooling wind temperature is 30° C., the winding speed is 3200 m/min, the added content of black masterbatch is of 0.018% of the mass of the modified polyester chips. The high-uniformity coloured industrial

TABLE 6 the high-uniformity coloured industrial yarn's mechanical properties, the melt viscosity drop rate at the temperature of 280° C., and the dry heat shrinkage rate of the industrial yarn under the condition of 177° C. × 10 min × 0.05 cN/dtex

| Example | Modified polyester source | Breaking strength (cN/dtex) | Elongation at break (%) | Melt viscosity drop value (%) | fiber density deviation rate (%) | CV value of breaking strength (%) | CV value of elongation at break (%) | Dry heat shrinkage rate (%) |
|---|---|---|---|---|---|---|---|---|
| 43 | Example 14 | 7.2 | 11.0 | 10 | 0.5 | 2.0 | 5.0 | 2.7 |
| 44 | Example 15 | 7.3 | 10.5 | 11 | 0.7 | 1.8 | 4.8 | 2.05 |
| 45 | Example 16 | 7.5 | 13.5 | 11.7 | 0.6 | 1.4 | 4.6 | 2.8 |

Example 46-48

In the preparation method of the high-uniformity coloured polyester industrial yarn, the high-uniformity coloured polyester industrial yarn is obtained by using the porous spinneret. The arrangement of the spinning holes on the spinneret is elliptical. The elliptical arrangement refers to that the centres of spinning holes are on the concentric ellipses. The concentric ellipses are a series of ellipses, all of which have the same long axis and the short axis.

The ratio of the long axis to short axis of the ellipse is 1.4, and the spacing between the neighbouring spinning holes yarn's mechanical properties, the melt viscosity drop rate at the temperature of 280° C., and the dry heat shrinkage rate of the industrial yarn under the condition of 177° C.×10 min×0.05 cN/dtex are shown in the table below.

TABLE 7 the high-uniformity coloured industrial yarn's mechanical properties, the melt viscosity drop rate at the temperature of 280° C., and the dry heat shrinkage rate of the industrial yarn under the condition of 177° C. × 10 min × 0.05 cN/dtex

| Example | Modified polyester source | Breaking strength (cN/dtex) | Elongation at break (%) | Melt viscosity drop value (%) | fiber density deviation rate (%) | CV value of breaking strength (%) | CV value of elongation at break (%) | Dry heat shrinkage rate (%) |
|---|---|---|---|---|---|---|---|---|
| 46 | Example 17 | 7.3 | 10.5 | 10 | 0.5 | 2.0 | 4.0 | 2.7 |
| 47 | Example 18 | 7.5 | 11.5 | 10 | 0.47 | 1.8 | 4.6 | 2.4 |
| 48 | Example 19 | 7.3 | 12.1 | 11.7 | 0.46 | 1.7 | 5.3 | 2.2 |

Example 49-51

In the preparation method of the high-uniformity coloured polyester industrial yarn, the high-uniformity coloured polyester industrial yarn is obtained by using the porous spinneret. The arrangement of the spinning holes on the spinneret is elliptical. The elliptical arrangement refers to that the centres of spinning holes are on the concentric ellipses.

The concentric ellipses are a series of ellipses, all of which have the same long axis and the short axis.

The ratio of the long axis to short axis of the ellipse is 1.4, and the spacing between the neighbouring spinning holes equals to the diameter of the guide holes of the spinning holes plus 1.6 mm. The spinnerets are circle spinneret and the diameter of the spinnerets has a difference of 12 mm to the longest long axis of the series of ellipses. The diameter of guide holes of the spinning holes is 1.5 mm. The number of spinning holes is 192, and the cutting shape of the micro spinning holes is square.

After processing the modified polyester by solid phase polycondensation, measuring, adding black masterbatch, porous spinneret extrusion, cooling, oiling, stretching, heat setting, and winding, we can obtain the high-uniformity coloured polyester industrial yarn. The temperature of extrusion is 300° C., the cooling wind temperature is 25° C., the winding speed is 2800 m/min, the added content of black masterbatch is of 0.01% of the mass of the modified polyester chips. The high-uniformity coloured industrial yarn's mechanical properties, the melt viscosity drop rate at the temperature of 280° C., and the dry heat shrinkage rate of the industrial yarn under the condition of 177° C.×10 min×0.05 cN/dtex are shown in the table below.

holes plus 1.6 mm. The spinnerets are circle spinneret and the diameter of the spinnerets has a difference of 12 mm to the longest long axis of the series of ellipses. The diameter of guide holes of the spinning holes is 1.5 mm. The number of spinning holes is 192, and the cutting shape of the micro spinning holes is square.

After processing the modified polyester by solid phase polycondensation, measuring, adding black masterbatch, porous spinneret extrusion, cooling, oiling, stretching, heat setting, and winding, we can obtain the high-uniformity coloured polyester industrial yarn. The temperature of extrusion is 320° C., the cooling wind temperature is 30° C., the winding speed is 3000 m/min, the added content of black masterbatch is of 0.03% of the mass of the modified polyester chips. The high-uniformity coloured industrial yarn's mechanical properties, the melt viscosity drop rate at the temperature of 280° C., and the dry heat shrinkage rate of the industrial yarn under the condition of 177° C.×10 min× 0.05 cN/dtex are shown in the table below.

TABLE 8 the high-uniformity coloured industrial yarn's mechanical properties, the melt viscosity drop rate at the temperature of 280° C., and the dry heat shrinkage rate of the industrial yarn under the condition of 177° C. × 10 min × 0.05 cN/dtex

| Example | Modified polyester source | Breaking strength (cN/dtex) | Elongation at break (%) | Melt viscosity drop value (%) | fiber density deviation rate (%) | CV value of breaking strength (%) | CV value of elongation at break (%) | Dry heat shrinkage rate (%) |
|---|---|---|---|---|---|---|---|---|
| 49 | Example 20 | 7.4 | 10.0 | 16 | 0.5 | 2.0 | 5.0 | 2.9 |
| 50 | Example 21 | 7.3 | 11.5 | 15 | 0.8 | 1.8 | 4.6 | 2.0 |
| 51 | Example 22 | 7.5 | 12.9 | 20 | 0.8 | 1.7 | 4.3 | 3.0 |

Example 52-57

In the preparation method of the high-uniformity coloured polyester industrial yarn, the high-uniformity coloured polyester industrial yarn is obtained by using the porous spinneret. The arrangement of the spinning holes on the spinneret is elliptical. The elliptical arrangement refers to that the centres of spinning holes are on the concentric ellipses. The concentric ellipses are a series of ellipses, all of which have the same long axis and the short axis.

The ratio of the long axis to short axis of the ellipse is 1.4, and the spacing between the neighbouring spinning holes equals to the diameter of the guide holes of the spinning

TABLE 9 the high-uniformity coloured industrial yarn's mechanical properties, the melt viscosity drop rate at the temperature of 280° C., and the dry heat shrinkage rate of the industrial yarn under the condition of 177° C. × 10 min × 0.05 cN/dtex

| Example | Modified polyester source | Breaking strength (cN/dtex) | Elongation at break (%) | Melt viscosity drop value (%) | fiber density deviation rate (%) | CV value of breaking strength (%) | CV value of elongation at break (%) | Dry heat shrinkage rate (%) |
|---|---|---|---|---|---|---|---|---|
| 52 | Example 23 | 7.4 | 12.0 | 10 | 0.5 | 1.0 | 4.0 | 2 |
| 53 | Example 24 | 7.3 | 10.5 | 11 | 0.47 | 1.8 | 4.6 | 2.8 |
| 54 | Example 25 | 7.0 | 11.4 | 11.7 | 0.46 | 1.5 | 5.4 | 2.8 |
| 55 | Example 26 | 7.4 | 21.0 | 10 | 0.5 | 2.0 | 5.3 | 2.7 |
| 56 | Example 27 | 7.8 | 10.5 | 11 | 0.47 | 1.8 | 4.6 | 3.0 |
| 57 | Example 28 | 7.3 | 12.1 | 11.7 | 0.46 | 1.7 | 5.2 | 2.9 |

What is claimed is:

1. A high-uniformity coloured polyester industrial yarn, wherein the high-uniformity coloured polyester industrial yarn is a polyester industrial yarn added with a black masterbatch, the high-uniformity coloured polyester industrial yarn is obtained by spinning after carrying out a solid phase polycondensation, the high uniformity coloured polyester industrial yarn comprises a modified polyester, wherein the modified polyester is composed of a terephthalic acid segment, an ethylene glycol segment and a branched diol segment, the branched diol segment is a diol having a branched chain, the branched chain is a non-terminal carbon on the branched diol segment and the branched chain has a linear carbon chain containing 5 to 10 carbon atoms, the high-uniformity coloured polyester industrial yarn has a breaking strength ≥7.0 cN/dtex, a linear density deviation rate ≤1.0%, and a breaking strength CV value ≤2.0%;

a CV value of elongation at break is ≤5.5%, a melt viscosity of the high uniformity coloured polyester industrial yarn is reduced by 10-20% at a temperature of 260-290° C.; and when a test condition is 177° C.×10 min×0.05 cN/dtex, a dry heat shrinkage ratio is 2.5±0.5%, and a melt viscosity drop is a comparison of the melt viscosity of the modified polyester and a polyester without the branched diol segment at a same temperature.

2. The high uniformity coloured polyester industrial yarn according to claim 1, wherein
the high-uniformity coloured polyester industrial yarn has an elongation at break of 12.0±1.5%; a number average molecular weight of the modified polyester ranges from 15,000 to 30.000.

3. The high-uniformity coloured polyester industrial yarn according to claim 1, wherein
the branched diol segment is one or more items selected from the group consisting of a 2-pentyl-1,3 propanediol segment, a 2-hexyl-1,3 propanediol segment, a 2-heptyl-1,3 propanediol segment, a 2-octyl-1,3 propanediol segment, a 2-pentyl-1,4 butanediol segment, a 2-hexyl-1,4 butanediol segment, a 2-heptyl-1,4 butanediol segment, a 2-octyl-1,4 butanediol segment, a 2-pentyl-1,5 pentanediol segment, a 2-hexyl-1,5-pentanediol segment, a 2-heptyl-1,5-pentanediol segment, a 2-octyl-1,5-pentanediol segment, a 2-pentyl-1,6 hexanediol segment, a 2-hexyl-1,6 hexanediol segment, a 2-heptyl-1,6-hexanediol segment, and a 2-octyl-1,6-hexanediol segment;
and a molar percentage of the branched diol segment to the ethylene glycol segment ranges from 2% to 5%.

4. A method for preparing the high-uniformity coloured polyester industrial yarn of claim 1, wherein the modified polyester is subjected to the solid phase polycondensation, metering, and adding the black masterbatch;
after porous spinneret extrusion by a porous spinneret, cooling, oiling, drawing, heat setting and winding to obtain the high uniformity coloured polyester industrial yarn;
the arrangement of the orifices on the porous spinneret is elliptical; the elliptical arrangement means that the centers of the orifices are located on concentric ellipses, and the concentric ellipses are a series of ellipses, and the long axes of all the ellipses are collinear, and the short axes of all the ellipses are collinear;
a method for preparing the modified polyester includes the following steps:
(1) preparation of terephthalic acid glycol ester:
mixing terephthalic acid and the branched hexanediol to a first slurry, and carrying out a first esterification reaction under a catalytic action of concentrated sulfuric acid to obtain the terephthalic acid glycol ester;
(2) preparation of ethylene terephthalate:
mixing the terephthalic acid and ethylene glycol to a second slurry, carrying out a second esterification reaction to obtain the ethylene terephthalate;
(3) preparation of the modified polyester:
after the second esterification reaction in the step (2) is completed, adding the terephthalic acid glycol ester prepared in the step (1), stirring and mixing, performing a polycondensation reaction under the action of the catalyst and the stabilizer, and under a condition of a negative pressure; first in a low vacuum stage and then in a high vacuum stage to obtain the modified polyester.

5. The method for preparing the high-uniformity coloured polyester industrial yarn of claim 4, wherein, in the method for preparing the modified polyester
the first slurry in the step (1) is added to a first reactor for carrying out the first esterification reaction; the first esterification reaction is carried out under a pressurized nitrogen environment, and the pressure is in a range of a normal pressure to 0.3 MPa, and a temperature is 180-240° C.; the first esterification reaction ends when a water distillation amount in the first esterification reaction reaches at least 90% of a first theoretical value; then the terephthalic acid glycol ester is obtained;
the second slurry in the step (2) is added into a second reactor for carrying out the second esterification reaction; the second esterification reaction is carried out under a pressurized nitrogen environment, and the pressure is in a range of normal pressure to 0.3 MPa, and a temperature is 250-260° C.; the second esterification reaction ends when a water distillation amount in the second esterification reaction reaches at least 90% of a second theoretical value; then the ethylene terephthalate is obtained;
in step (3) the stirring and mixing is performed for 15-20 minutes under the action of the catalyst and the stabilizer, and the negative pressure; in the polycondensation reaction under the condition of the low-vacuum stage, the pressure is smoothly pumped from the normal pressure to an absolute pressure under 500 Pa, a temperature is controlled at the temperature of 260-270° C., and a reaction time is 30-50 minutes; then turn to the high vacuum stage, the polycondensation reaction continues and the reaction pressure is reduced to an absolute pressure of less than 100 Pa, and the reaction temperature is controlled at the temperature of 275 to 280° C., and the reaction time is 50 to 90 minutes in order to obtain the modified polyester;
obtaining modified polyester chips by granulate the modified polyester and carrying out the solid phase polycondensation of the modified polyester chips in order to make an inherent viscosity of the modified polyester increase to 1.0-1.2 dL/g to form a high-viscosity chip; after measuring, adding the black masterbatch, the extrusion of porous spinneret, cooling oiling, stretching, heat setting and winding, the high-uniformity coloured polyester industrial yarn is obtained;
a mass ratio of the black masterbatch to the modified polyester chips ranges from 0.01%-0.03%;
spinning process parameters of the high-uniformity coloured polyester industrial yarn are as follows:
an extrusion temperature is 290-320° C.;
a wind temperature is 20-30° C.;
a winding speed is 2600-3200 m/min.

6. The method for preparing the high-uniformity coloured polyester industrial yarn of claim 5, wherein, in step (1), a molar ratio of the terephthalic acid to the branched diol is 1:1.3-1.5; an amount of the concentrated sulfuric acid added is 0.3-0.5% of a weight of the terephthalic acid; a concentration of concentrated sulfuric acid is 50-60 wt %;

in step (2), a molar ratio of the terephthalic acid to the ethylene glycol is 1:1.2-2.0;

in step (3), a molar percentage value of the diol terephthalate and the ethylene terephthalate is 2-5%; the catalyst is antimony trioxide, antimony glycol or antimony acetate, and an amount of catalyst added is 0.01%-0.05% of the total weight of the terephthalic acid; the stabilizer is triphenyl phosphate, trimethyl phosphate or trimethyl phosphite, and an amount of stabilizer added is 0.01%-0.05% of the total weight of the terephthalic acid;

a number average molecular weight of the modified polyester ranges from 15000-30000.

7. The method for preparing the high-uniformity coloured polyester industrial yarn according to claim 5, wherein the branched diol is one or more selected from the group consisting of a 2-pentyl-1,3 propanediol, a 2-hexyl-1,3 propanediol, a 2-heptyl-1,3 propanediol, a 2-octyl-1,3 propanediol, a 2-pentyl-1,4 butanediol, a 2-hexyl-1,4 butanediol, a 2-heptyl-1,4 butanediol, a 2-octyl-1,4 butanediol, a 2-pentyl-1,5 pentanediol, a 2-hexyl-1,5-pentanediol, a 2-heptyl-1,5-pentanediol, a 2-octyl-1,5-pentanediol, a 2-pentyl-1,6 hexanediol segment, a 2-hexyl-1,6 hexanediol, a 2-heptyl-1,6-hexanediol, and a 2-octyl-1,6-hexanediol.

8. The preparation method of the high uniformity coloured polyester industrial yarn according to claim 4, wherein the spinneret is a circular spinneret or an elliptical spinneret; a difference between a diameter of the circular spinneret and a maximum length of the long axis of the series ellipse is greater than 10 mm, and a difference value between the elliptical spinneret and the maximum length of the long axis of the series ellipse is greater than 10 mm.

9. The preparation method of the high-uniformity coloured polyester industrial yarn according to claim 4, wherein the arrangement of the spinneret holes is long axis and/or short axis symmetry; a ratio of the length the long axis of the ellipse to the length of the short axis of the ellipse ranges from 1.3-1.8; a spacing of the adjacent spinneret holes is greater than a diameter of a guide hole of the spinneret hole plus 1.5 mm.

10. The method for preparing a high-uniformity coloured polyester industrial yarn according to claim 9, wherein the guide hole diameter of the spinneret ranges from 1.5-2.5 mm; the number of spinneret holes is greater than or equal to 192, and the cross-section shape of the spinneret spinning hole is a circle, square, diamond, linear shape, triangle, trilobal shape, hollow type or flat type.

11. The method for preparing a high-uniformity coloured polyester industrial yarn according to claim 4, wherein the high-uniformity coloured polyester industrial yarn has an elongation at break of 12.0±1.5%; a number average molecular weight of the modified polyester ranges from 15,000 to 30,000.

12. The method for preparing a high-uniformity coloured polyester industrial yarn according to claim 4, wherein the branched diol segment is one or more items selected from the group consisting of a 2-pentyl-1,3 propanediol segment, a 2-hexyl-1,3 propanediol segment, a 2-heptyl-1,3 propanediol segment, a 2-octyl-1,3 propanediol segment, a 2-pentyl-1,4 butanediol segment, a 2-hexyl-1,4 butanediol segment, a 2-heptyl-1,4 butanediol segment, a 2-octyl-1,4 butanediol segment, a 2-pentyl-1,5 pentanediol segment, a 2-hexyl-1,5-pentanediol segment, a 2-heptyl-1,5-pentanediol segment, a 2-octyl-1,5-pentanediol segment, a 2-pentyl-1,6 hexanediol segment, a 2-hexyl-1,6 hexanediol segment, a 2-heptyl-1,6-hexanediol segment, and a 2-octyl-1,6-hexanediol segment;

and a molar percentage of the branched diol segment to the ethylene glycol segment ranges from 2% to 5%.

\* \* \* \* \*